R. R. SANDHAM.
SPRAYING ATTACHMENT FOR BATH TUBS.
APPLICATION FILED SEPT. 14, 1908.
917,157.  Patented Apr. 6, 1909.
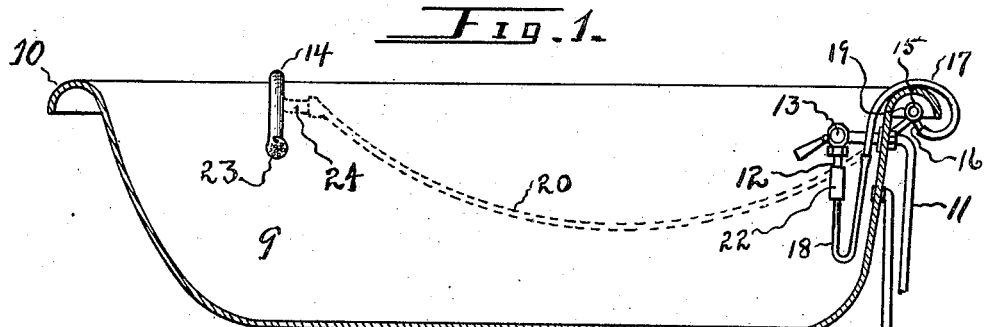
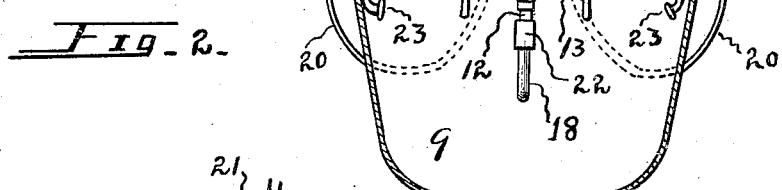
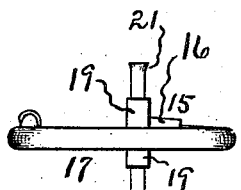
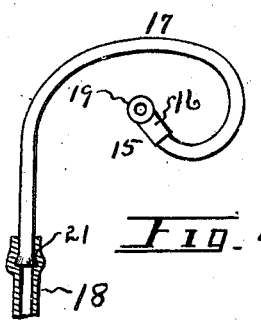
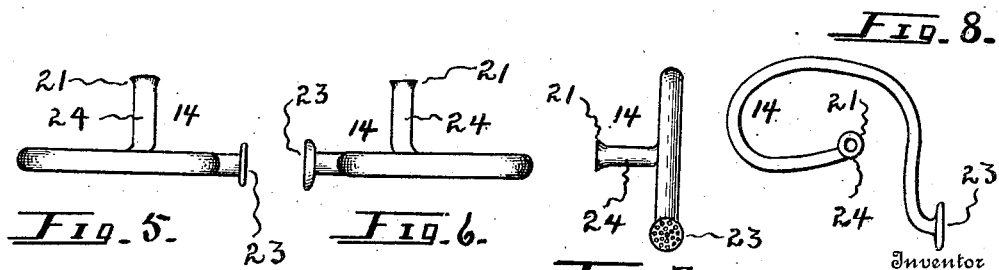
Witnesses
H. L. Compton
W. A. Lewis
Inventor
Ralph R. Sandham
By Hiram A. Sturges,
Attorney

UNITED STATES PATENT OFFICE.

RALPH R. SANDHAM, OF OMAHA, NEBRASKA.

SPRAYING ATTACHMENT FOR BATH-TUBS.

No. 917,157.   Specification of Letters Patent.   Patented April 6, 1909.

Application filed September 14, 1908. Serial No. 453,015.

*To all whom it may concern:*

Be it known that I, RALPH R. SANDHAM, a citizen of the United States, residing at Omaha, in the county of Douglas and State of Nebraska, have invented certain new and useful Improvements in Spraying Attachments for Bath-Tubs, of which the following is a specification.

This invention relates to improvements in spraying attachments for bath tubs, and has for its principal object the provision of rigid spraying arms adapted to have seatings and to be slidable upon the rim of the tub, under control of the operator, so that water may be thrown, as a spray, from adjacent the inner sides of the tub, in a direction of the opposite side thereof, for bathing purposes and for cleaning or rinsing the tub.

Means in general use for the shower bath require the bather to assume a standing posture, a supported cloth tent or rubber inclosure being employed, thereby involving an expense and inconvenience avoidable, or so considered, by employing the herein described spraying attachment.

The invention includes convenient means for reliably connecting the novel parts of the spraying attachments with the supply parts of the bath tub, and the employment of flexible connecting tubes or hose, and has reference to the form of the arms employed, so they will be unobtrusive.

With these and other objects in view the invention consists of the novel combination and arrangement of elements as described herein, pointed out by the appended claims, and as illustrated in the accompanying drawing, wherein,—

Figure 1 is a longitudinal, sectional view of a bath tub, with a spraying attachment thereon, embodying my invention. Fig. 2 is a transverse, sectional view of a bath tub, with the spraying attachment thereon. Figs. 3 and 4 are, respectively, plan and side views of the rigid pipe-supporting arm for use upon the supply-end of the tub, a broken-away portion of hose, in section, being added to Fig. 4. Figs. 5 and 6 are plan views of the rigid, slidable spraying arms. Figs. 7 and 8 are, respectively, front and side views of the slidable spraying arm shown by Fig. 6.

Referring now to the drawing for a more particular description, numeral 9 indicates a bath tub having a continuous, outwardly curved rim or terminal hood 10, the water supply-pipes and nozzle being shown, respectively, at 11 and 12, and under control of valves 13.

I provide a pair of spraying tubes or arms 14, adapted to rest and to have a sliding movement upon the rim and at opposite sides of the tub. I provide the T pipe union 15, its single stem 16 being in communication with supply-nozzle 12 by means of the supporting-arm 17 and conducting-pipe 18, the supporting-arm 17 having a seating transversely upon rim 10. The opposed stems 19 of pipe union 15 are connected with spraying arms 14 by means of the flexible conducting pipes, tubes or hose 20. Arm 17 is a curved pipe, the T pipe union being a part thereof, or secured thereto in any suitable manner; the purpose of the supporting-arm being to sustain the stems of union 15 in operative relation, to conduct water, and sustain the weight of pipes or tubes 18 and 20.

While I do not limit myself to the use of any particular material, arms 14 and 17 are preferably of metallic construction and provided with expanded terminals 21 for connection with tubes 20 and 18, these tubes preferably being of rubber. Tube or pipe 18 is provided with the holding-cap 22, preferably constructed of rubber, and this may be secured upon nozzle 12. The free ends of arms 14 are enlarged and are provided with perforated covers 23, to form spraying-disks.

In operation, water entering the supply pipes, may, under control of valves 13, be conveyed from the supply nozzle 12 and be discharged within the tub through spraying disks 23, the water passing, respectively, conducting-pipe 18, supporting-arm 17, flexible pipes 20 and the slidable arms 14.

It will be noted that arms 14 and 17 have longitudinal curvatures, their outer surfaces being convexed, and that they conform substantially to the transverse curvature of the tub rim. On this account flexible tubes 20 are not obtrusive in use, and a stream or spray may be directed within the tub from adjacent each of the sides thereof in a direction toward the opposite side; and this is a desired result, as first mentioned, for purposes of cleaning and rinsing the tub, or for bathing purposes. Each of arms 14 are preferably formed as single, rigid members having the holding-arm 24 extended horizontally, and when arms 14 are operatively seated, the horizontal portion, branch or arm 24 extends lengthwise of the tub, beneath rim 10. Since arms 14 are slidable, they will direct streams or spray at various points, wherever desired, along the tub, being limited only by the length of tubes 20, and by reason of the curvature mentioned for these arms, while readily removable, they will normally remain seated transversely upon rim 10, as shown in the drawing.

The device, as described, is a convenient article for use and may be attached to bath tubs generally or may be readily detached therefrom.

Having fully described my invention, what I claim as new and desire to secure by Letters Patent is,—

1. In spraying attachments for bath tubs, the combination with the transversely and outwardly curved terminal rim and with the water supply-pipe of the bath tub, of rigid spraying members formed as tubes having a curvature substantially conforming to the curvature of and disposed transversely upon said rim; flexible conducting tubes connecting between said water supply-pipe and said spraying members.

2. In spraying attachments for bath tubs, the combination with the transversely and outwardly curved terminal rim and with the water supply-pipe of the bath tub, of rigid spraying members each formed as a tube having a lengthwise curvature substantially conforming to the transverse curvature of said rim and formed with a transversely extended portion, said spraying members disposed transversely and slidably upon said rim; flexible conducting-tubes connecting between said water supply-pipe and the transversely extended portion of each of said spraying members.

3. In spraying attachments for bath tubs, the combination with the water supply-pipe and with the rim of the tub, of spraying-members slidably and transversely seated upon said rim; a tubular curved supporting-arm adapted to have a seating upon said rim intermediate said spraying members and having upon one of its terminals a conducting tube in communication with a water supply-pipe, the opposite terminal of said supporting-arm having flexible conducting tubes in communication with said spraying-members.

4. In spraying attachments for bath tubs, the combination with the water-supply-pipe and with the rim of the tub, of tubular arms slidably seated upon said rim and provided upon one of their terminals with spraying devices, their opposite terminals having expanded portions; a tubular curved supporting-arm having expanded terminals and adapted to have a seating upon said rim; a conducting tube in communication with said water-supply-pipe and one of the expanded terminals of said curved supporting-arm; flexible conducting pipes disposed exteriorly of the tub and extended between and having end-mountings upon the expanded opposite terminals of said supporting-arm and the expanded portions of said tubular arms.

In testimony whereof I have affixed my signature in presence of two witnesses.

RALPH R. SANDHAM.

Witnesses:
  HIRAM A. STURGES,
  CHAS. BATTELLE.